United States Patent
Nikam et al.

(10) Patent No.: US 12,518,465 B2
(45) Date of Patent: Jan. 6, 2026

(54) EFFICIENTLY HANDLING RESTART INDICES DURING TILE-BASED DEFERRED RENDERING (TBDR) BY GRAPHICS PROCESSING UNITS (GPUs)

(71) Applicant: QUALCOMM Incorporated, San Diego, CA (US)

(72) Inventors: Vishwanath Shashikant Nikam, Bangalore (IN); Kalyan Kumar Bhiravabhatla, Bengaluru (IN); Sampathkumar Periasamy, Bangalore (IN); Suvam Chatterjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 178 days.

(21) Appl. No.: 18/476,258

(22) Filed: Sep. 27, 2023

(65) Prior Publication Data
US 2025/0104325 A1    Mar. 27, 2025

(51) Int. Cl.
G06T 15/00    (2011.01)
G06T 15/04    (2011.01)

(52) U.S. Cl.
CPC ............ G06T 15/005 (2013.01); G06T 15/04 (2013.01)

(58) Field of Classification Search
CPC ....... G06T 15/005; G06T 15/04; G06T 11/40; G06T 17/20
See application file for complete search history.

(56) References Cited

U.S. PATENT DOCUMENTS

2017/0178401 A1    6/2017 Agrawal et al.
2018/0137676 A1*   5/2018 Arrabi ................. G06T 15/80

FOREIGN PATENT DOCUMENTS

WO    2022220979 A1    10/2022

OTHER PUBLICATIONS

Craighead M., "NV_Primitive_Restart—GL_NV_Primitive_Restart", Aug. 10, 2022, pp. 1-5, XP093215471, The Whole Document.
International Search Report and Written Opinion for International Patent Application No. PCT/US2024/042116, mailed Nov. 18, 2024, 14 pages.

* cited by examiner

Primary Examiner — Haixia Du
(74) Attorney, Agent, or Firm — W&T (57) ABSTRACT

Efficiently handling restart indices during tile-based deferred rendering (TBDR) by graphics processing units (GPUs) is disclosed herein. In some aspects, a processor circuit of a GPU determines, during a tile sorting pass, a location of a restart index in a plurality of indices of an index buffer associated with a primitive topology, and determines a skip count indicating a number of indices to skip during a tile rendering pass, based on the primitive topology and the location of the restart index. In some aspects, the processor circuit also determines visibility statuses corresponding to primitives of the primitive topology, and generates visibility data comprising the visibility statuses and the skip count. Subsequently, during the tile rendering pass, the processor circuit bypasses fetching of the restart index, based on the skip count. According to some aspects, the processor circuit may also assemble the primitives based on the visibility data.

17 Claims, 8 Drawing Sheets

EFFICIENTLY HANDLING RESTART INDICES DURING TILE-BASED DEFERRED RENDERING (TBDR) BY GRAPHICS PROCESSING UNITS (GPUs)

BACKGROUND

I. Field of the Disclosure

The technology of the disclosure relates generally to graphics processing units (GPUs) in processor-based devices, and, in particular, to optimizing the performance of GPUs performing tile-based deferred rendering (TBDR).

II. Background

Modern processor-based devices include a dedicated processing unit known as a graphics processing unit (GPU) to accelerate the rendering of graphics and video data for display. A GPU may be implemented as an integrated element of a general-purpose central processing unit (CPU) of a processor-based device, or as a discrete hardware element that is separate from the CPU. Conventional GPU architectures may provide support for a mode known as tile-based deferred rendering (TBDR), which is used to render a three-dimensional (3D) graphics image. When using TBDR, the GPU divides a screen space into smaller grid areas ("tiles") for processing, which allows the GPU to hold depth and color data for each tile in on-chip graphics memory. Rendering of the graphics image is performed one tile at a time by the GPU, and is handled in two passes: a tile sorting pass and a tile rendering pass. During the tile sorting pass, the GPU determines the visibility of each "primitive," which is the simplest geometric shape (such as a point, a line, or a triangle, as non-limiting examples) that is associated with a given primitive topology (e.g., a point list, a line list, a line strip, a line loop, a triangle list, a triangle strip, or a triangle fan, as non-limiting examples). The GPU also sorts the primitives in the tile into different groups or "bins," and generates bin-level primitive visibility information. In the tile rendering pass, the GPU uses the bin-level primitive visibility information to render the screen space one bin at a time. To do so, the GPU fetches the primitives that are marked as visible for a given tile from memory, assembles the primitives, and performs any further necessary processing.

During the tile sorting pass and the tile rendering pass, an index buffer of the GPU stores indices that point to data for one or more vertices, in sequence, that define the shape of a primitive for a given primitive topology. The GPU processes each index in order to retrieve the corresponding vertex data and build each primitive. To enable data for multiple instances of a primitive topology to be stored in the index buffer, conventional GPU architectures may support a "primitive restart" function that defines a specific data value as a "restart index." When the restart index is encountered during processing of the indices of the index buffer, the GPU begins assembling a new instance of the primitive topology from the next sequential index.

However, the use of the primitive restart function is associated with some drawbacks. For example, if a restart index is present in the index buffer, the GPU cannot assemble the primitives in the tile rendering pass using the primitive visibility information provided from the tile sorting pass, because the presence of the restart index changes the GPU's interpretation of the indices that are used to form the primitives. Conventional GPU architectures address this issue by marking all primitives as visible for all tiles after the restart index is detected during the tile sorting pass. Subsequently, in the tile rendering pass, as primitives are made visible, an input assembler of the GPU will fetch the restart index and all subsequent indices from the index buffer to assemble all primitives correctly. This approach, though, may negatively impact the GPU's performance when the restart index is present, as it may require invisible primitives to be processed in the tile rendering pass. Moreover, the presence of the restart index may limit throughput in GPUs that implement a "sliced" GPU architecture that enables index fetching and primitive assembly in parallel. Because the restart index may alter the assembly of primitives that follow the restart index, index fetching and primitive assembly must be performed in a sequential manner.

Accordingly, more efficient handling of restart indices by the GPU during TBDR may be desirable.

SUMMARY OF THE DISCLOSURE

Aspects disclosed in the detailed description include efficiently handling restart indices during tile-based deferred rendering (TBDR) by graphics processing units (GPUs). Related apparatus, methods, and computer-readable media are also disclosed. In this regard, a GPU is configured to provide information about how many indices within an index buffer need to be skipped during a tile rendering pass to enable the tile rendering pass to assemble primitives without fetching the restart index. In some exemplary aspects disclosed herein, a processor circuit of a GPU determines, during a tile sorting pass, a location of a restart index in a plurality of indices of an index buffer associated with a primitive topology. The processor circuit then determines a skip count indicating a number of indices to skip among the plurality of indices during a tile rendering pass, based on the primitive topology and the location of the restart index. In some aspects, the processor circuit also determines one or more visibility statuses corresponding to one or more primitives of the primitive topology, and generates visibility data comprising the one or more visibility statuses and the skip count. Subsequently, during the tile rendering pass, the processor circuit bypasses fetching of the restart index, based on the skip count. According to some aspects, the processor circuit may also assemble the one or more primitives based on the visibility data.

In some aspects, determining the skip count may comprise determining that the location of the restart index is within a first V indices of the plurality of indices, where the primitive topology is defined by a minimum number V of indices of the plurality of indices. In response to determining that the location of the restart index is within the first V indices of the plurality of indices, the processor circuit in such aspects determines that the skip count is equal to the location of the restart index. According to some aspects, determining the skip count may comprise the processor circuit determining that the location of the restart index is subsequent to an ordinal first primitive of the one or more primitives. Responsive to determining that the location of the restart index is subsequent to the ordinal first primitive of the one or more primitives, the processor circuit in such aspects determines that the skip count is equal to one (1).

In another aspect, a GPU is disclosed. The GPU comprises an index buffer that is associated with a primitive topology and that comprises a plurality of indices. The GPU further comprises a processor circuit that is configured to, during a tile sorting pass, determine a location of a restart index in the plurality of indices of the index buffer. The processor circuit is further configured to, during the tile sorting pass, determine a skip count indicating a number of indices to skip among the plurality of indices during a tile rendering pass, based on the primitive topology and the location of the restart index. The processor circuit is also configured to, during the tile rendering pass, bypass fetching of the restart index, based on the skip count.

In another aspect, a GPU is disclosed. The GPU comprises means for determining, during a tile sorting pass, a location of a restart index in a plurality of indices of an index buffer. The GPU further comprises means for determining, during the tile sorting pass, a skip count indicating a number of indices to skip among the plurality of indices during a tile rendering pass, based on a primitive topology and the location of the restart index. The GPU also comprises means for bypassing, during the tile rendering pass, fetching of the restart index, based on the skip count.

In another aspect, a method for efficiently handling restart indices during TBDR by GPUs is disclosed. The method comprises, during a tile sorting pass, determining, by a processor circuit of a GPU, a location of a restart index in a plurality of indices of an index buffer associated with a primitive topology. The method further comprises, during the tile sorting pass, determining, by the processor circuit, a skip count indicating a number of indices to skip among the plurality of indices during a tile rendering pass, based on the primitive topology and the location of the restart index. The method also comprises, during the tile rendering pass, bypassing, by the processor circuit, fetching of the restart index, based on the skip count.

In another aspect, a non-transitory computer-readable medium is disclosed. The non-transitory computer-readable medium stores computer-executable instructions that, when executed, cause a processor of a processor-based device to, during a tile sorting pass, determine a location of a restart index in a plurality of indices of an index buffer associated with a primitive topology. The computer-executable instructions further cause the processor to, during the tile sorting pass, determine a skip count indicating a number of indices to skip among the plurality of indices during a tile rendering pass, based on the primitive topology and the location of the restart index. The computer-executable instructions also cause the processor to, during the tile rendering pass, bypass fetching of the restart index, based on the skip count.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like are used herein to distinguish between similarly named elements, and are not to be interpreted as indicating an ordinal relationship between such elements unless expressly described as such herein.

Aspects disclosed in the detailed description include efficiently handling restart indices during tile-based deferred rendering (TBDR) by graphics processing units (GPUs). Related apparatus, methods, and computer-readable media are also disclosed. In this regard, a GPU is configured to provide information about how many indices within an index buffer need to be skipped during a tile rendering pass to enable the tile rendering pass to assemble primitives without fetching the restart index. In some exemplary aspects disclosed herein, a processor circuit of a GPU determines, during a tile sorting pass, a location of a restart index in a plurality of indices of an index buffer associated with a primitive topology. The processor circuit then determines a skip count indicating a number of indices to skip among the plurality of indices during a tile rendering pass, based on the primitive topology and the location of the restart index. In some aspects, the processor circuit also determines one or more visibility statuses corresponding to one or more primitives of the primitive topology, and generates visibility data comprising the one or more visibility statuses and the skip count. Subsequently, during the tile rendering pass, the processor circuit bypasses fetching of the restart index, based on the skip count. According to some aspects, the processor circuit may also assemble the one or more primitives based on the visibility data.

In some aspects, determining the skip count may comprise determining that the location of the restart index is within a first V indices of the plurality of indices, where the primitive topology is defined by a minimum number V of indices of the plurality of indices. In response to determining that the location of the restart index is within the first V indices of the plurality of indices, the processor circuit in such aspects determines that the skip count is equal to the location of the restart index. According to some aspects, determining the skip count may comprise the processor circuit determining that the location of the restart index is subsequent to an ordinal first primitive of the one or more primitives. Responsive to determining that the location of the restart index is subsequent to the ordinal first primitive of the one or more primitives, the processor circuit in such aspects determines that the skip count is equal to one (1).

Figure 1:
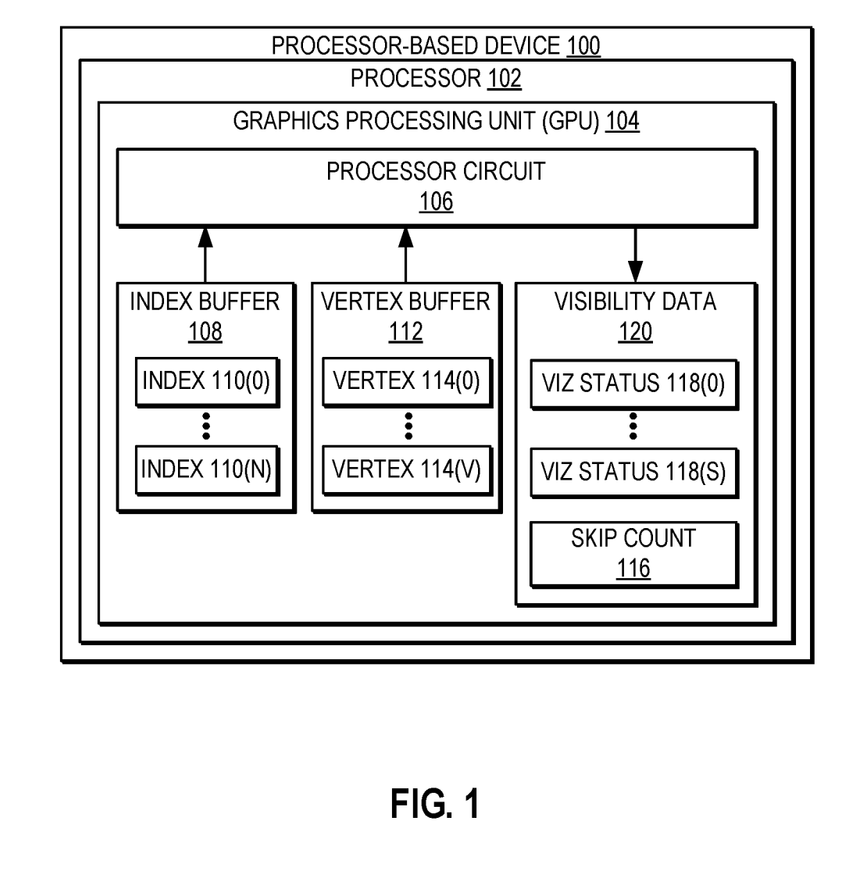
FIG. 1 is a block diagram of an exemplary processor-based system that includes a processor with a graphics processing unit (GPU) configured to efficiently handle restart indices during tile-based deferred rendering (TBDR), according to some aspects.

In this regard, FIG. 1 is a block diagram of an exemplary processor-based device 100. The processor-based device 100 comprises a processor 102 (also referred to a "processor core" or a "CPU core"), which may be an in-order or an out-of-order processor (OoP), and/or may be one of a plurality of processors 102 provided by the processor-based device 100. Examples of the processor 102 may include, but are not limited to, a digital signal processor (DSP), general-purpose microprocessor, application specific integrated circuit (ASIC), field programmable logic array (FPGA), or other equivalent integrated or discrete logic circuitry.

As seen in FIG. 1, the processor 102 comprises a graphics processing unit (GPU) 104, which provides a processor circuit 106 for performing graphical operations. As a non-limiting example, the GPU 104 may comprise a dedicated hardware unit having fixed functionality and programmable components for rendering graphics and executing GPU applications. The GPU 104 may also include a DSP, general-purpose microprocessor, ASIC, FPGA, or other equivalent integrated or discrete logic circuitry, which are not shown in FIG. 1 for the sake of clarity. Note that, while the processor 102 and GPU 104 are illustrated as a single unit in the example of FIG. 1, in some examples, the processor 102 and GPU 104 may be implemented as separate hardware elements. Although not shown in FIG. 1, it is to be understood that the processor 102 of FIG. 1 may execute a software application or provide an application programming interface (API) that submits, to the processor 102, graphics instructions from which a graphics workload may be determined for processing by the GPU 104.

The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based device 100 may include elements in addition to those illustrated in FIG. 1, and/or may include more or fewer of the elements illustrated in FIG. 1. For example, the processor-based device 100 may further include additional processors 102, processor cores, caches, controllers, communications buses, and/or persistent storage devices, which are omitted from FIG. 1 for the sake of clarity.

To optimize physical design, clock frequency, design scalability, and workload imbalance, the GPU 104 some aspects may implement a sliced GPU architecture. In such aspects, the GPU 104 may be configured to include multiple hardware slices (not shown) that each provides hardware elements that provide functionality corresponding to conventional elements of a graphics pipeline of a GPU. The sliced GPU architecture according to such aspects enable the GPU 104 to achieve higher throughput by performing operations such as index fetching and primitive assembly in parallel.

The GPU 104 of FIG. 1 is configured to perform support for a TBDR mode that is used to render a three-dimensional (3D) graphics image. Operating in the TBDR mode involves the GPU 104 dividing the graphics image by a regular grid, and processing each section of the grid (i.e., "tile") separately. This reduces the memory and bandwidth requirements for processing the image and enables the GPU 104 to hold depth and color data for each tile in on-chip graphics memory. Rendering of the graphics image is performed by the GPU one tile at a time, and happens in two passes: a tile sorting pass and a tile rendering pass. During the tile sorting pass, the GPU 104 determines the visibility of each "primitive," which the simplest geometric shape (such as a point, a line, or a triangle, as non-limiting examples) that is associated with a given primitive topology (e.g., a point list, a line list, a line strip, a line loop, a triangle list, a triangle strip, or a triangle fan, as non-limiting examples) within a tile that is being processed. The GPU also sorts the primitives in the tile into different groups or "bins" based on location, and generates bin-level primitive visibility information. In the tile rendering pass, the GPU uses the bin-level primitive visibility information to render the screen space one bin at a time. To do so, the GPU fetches the primitives that are marked as visible for a given tile from memory, assembles the primitives, and performs any further necessary processing.

To store the data that defines primitives during the tile sorting pass and the tile rendering pass, the GPU 104 provides an index buffer 108 that stores a plurality of indices 110(0)-110(N). Each of the indices 110(0)-110(N) comprises an integer offset into a vertex buffer 112 that stores data for a plurality of vertices 114(0)-114(V). The index buffer 108 is associated with a particular type of primitive topology, examples of which are discussed below in greater detail with respect to FIGS. 2A and 2B. The indices 110(0)-110(N) of the index buffer 108 indicate a specific sequence of the vertices 114(0)-114(V) to define the shape of one or more primitives for a given instance of a primitive topology. Thus, for example, if the index buffer is associated with the triangle fan primitive topology, the indices 110(0)-110(N) define the shape of one or more triangle primitives that make up an instance of the triangle fan primitive topology.

The indices 110(0)-110(N) of the index buffer 108 may all be used to define a single instance of a primitive topology. In addition, conventional GPU architectures may support a "primitive restart" function that enables data for multiple instances of a primitive topology to be stored in the index buffer 108. The primitive restart function defines a specific data value that may be stored as one of the indices 110(0)-110(N) (i.e., a "restart index") in the index buffer 108. When the restart index is encountered during processing of the indices 110(0)-110(N) of the index buffer 108, the GPU 104 begins assembling a new instance of the primitive topology from the next sequential index. An example of the use of a restart index to store data for two (2) instances of the triangle fan primitive topology in the index buffer 108 is discussed in greater detail below with respect to FIG. 3.

However, as noted above, the use of the primitive restart function has disadvantages. The presence of a restart index in the index buffer 108 limits the ability of the GPU 104 to assemble the primitives in the tile rendering pass using the primitive visibility information provided from the tile sorting pass, because the presence of the restart index changes the interpretation of the indices 110(0)-110(N) that are used to form the primitives. The conventional approach to addressing this issue involves marking all primitives as visible for all tiles after the restart index is detected during the tile sorting pass, and subsequently fetching the restart index and all subsequent indices from the index buffer 108 as primitives are made visible to assemble all primitives correctly. This approach, though, may negatively impact the GPU's performance, as it may require invisible primitives to be processed in the tile rendering pass. Additionally, because the restart index may alter the assembly of primitives that follow the restart index, index fetching and primitive assembly cannot be performed in parallel, but rather must be performed in a sequential manner.

In this regard, the GPU 104 is configured to provide efficient handling of restart indices during TBDR. In exemplary operation, the processor circuit 106, during a tile sorting pass, determines a location of a restart index (not shown) in the plurality of indices 110(0)-110(N) of the index buffer 108, which is associated with a primitive topology.

The processor circuit 106 determines a skip count 116 indicating a number of indices to skip among the plurality of indices 110(0)-110(N) during a tile rendering pass, based on the primitive topology and the location of the restart index. The processor circuit 106 in some aspects also determines one or more visibility statuses (each captioned as "VIZ STATUS" in FIG. 1) 118(0)-118(S) corresponding to one or more primitives (not shown) of the primitive topology that are defined by the indices 110(0)-110(N). The processor circuit 106 in such aspects generates visibility data 120 that comprises the one or more visibility statuses 118(0)-118(S) and the skip count 116. During the tile rendering pass, the processor circuit 106 bypasses fetching of the restart index based on the skip count 116, thus enabling parallel index fetching and primitive assembly. The processor circuit 106 in the aspects referenced above may also assemble the one or more primitives based on the visibility data 120, which allows redundant processing of invisible primitives to be avoided during the tile render pass.

In some aspects, determining the skip count 116 may comprise determining that the location of the restart index is within a first V indices of the plurality of indices 110(0)-110(N), where the primitive topology is defined by a minimum number V of indices of the plurality of indices 110(0)-110(N). In response to determining that the location of the restart index is within the first V indices of the plurality of indices 110(0)-110(N), the processor circuit 106 in such aspects determines that the skip count 116 is equal to the location of the restart index. For example, if the restart index is at the first location within the index buffer 108 (i.e., the first index 110(0)), the processor circuit 106 determines the skip count to be equal to one (1). According to some aspects, determining the skip count 116 may comprise the processor circuit 106 determining that the location of the restart index is subsequent to an ordinal first primitive of the one or more primitives that are defined by the indices 110(0)-110(N). Responsive to determining that the location of the restart index is subsequent to the ordinal first primitive of the one or more primitives, the processor circuit 106 in such aspects determines that the skip count 116 is equal to one (1). An example of the visibility data 120 and the skip count 116 that may be generated by the processor circuit 106 is discussed in greater detail below with respect to FIG. 4.

Figure 2A:
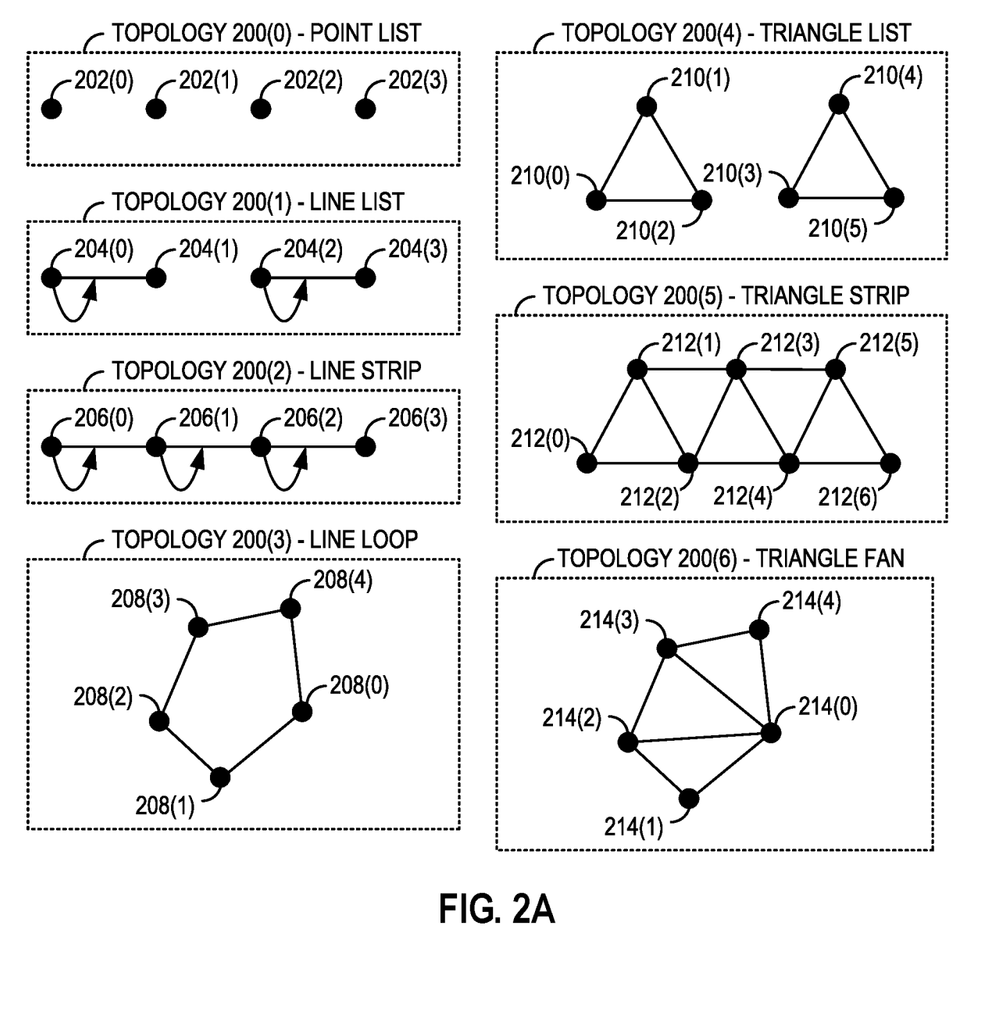
FIGS. 2A-2B are block diagrams illustrating exemplary primitive topologies that may be processed by the GPU of FIG. 1 during TBDR, according to some aspects.
Figure 2B:
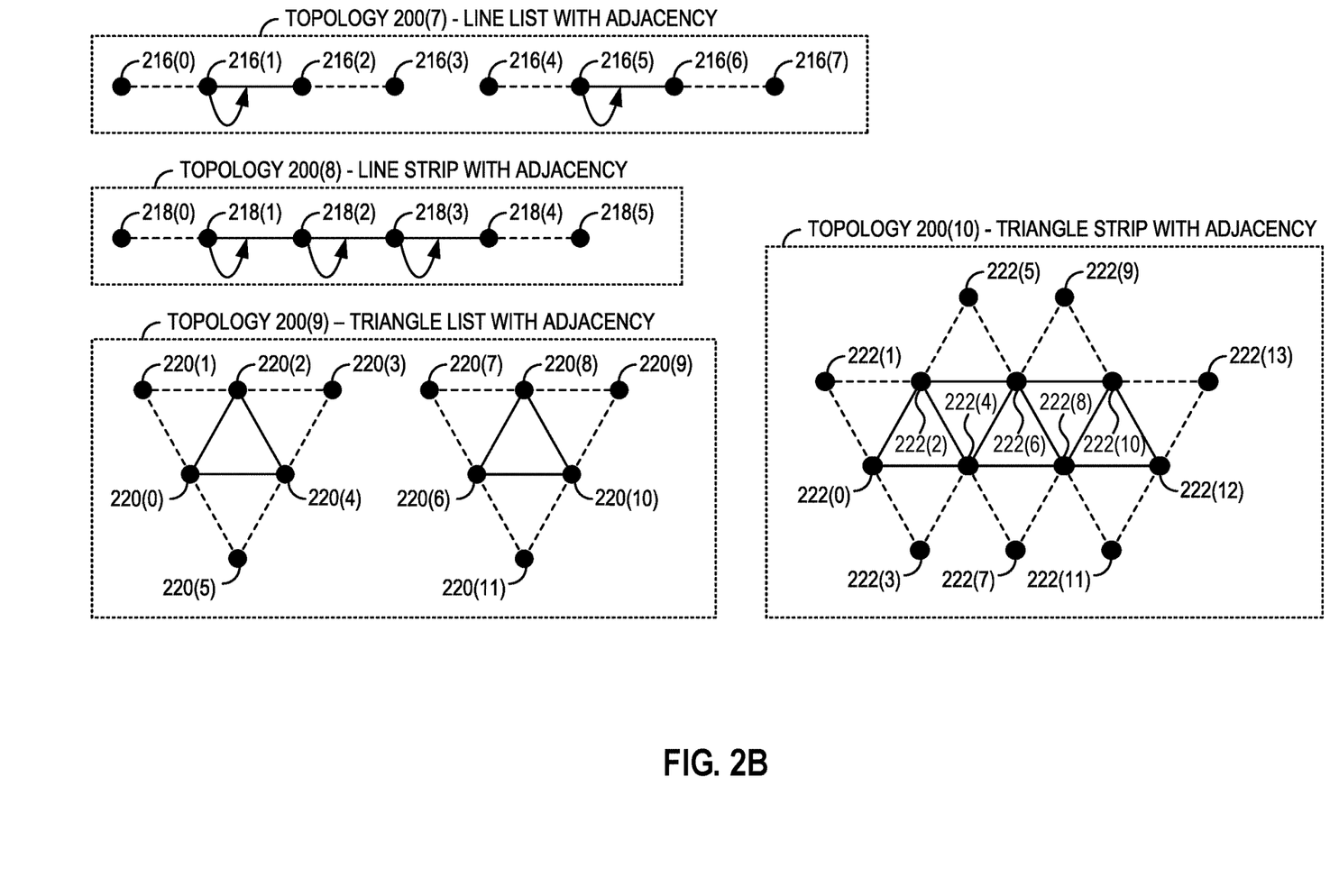

It is to be understood that the indices 110(0)-110(N) of the index buffer 108 of FIG. 1, each of which points to a vertex of the vertices 114(0)-114(V) of the vertex buffer 112 of FIG. 1, may define one or more instances of any one of multiple different primitive topologies, depending on which primitive topology is associated with the index buffer 108. In this regard, FIGS. 2A-2B illustrate exemplary instances of primitive topologies (each captioned as "TOPOLOGY" in FIGS. 2A-2B) 200(0)-200(10) that may be rendered by the GPU 104 of FIG. 1 while operating in the TBDR mode, according to some aspects. Each instance of the primitive topologies 200(0)-200(10) comprises a series of vertices, the order of which corresponds to the order in which the indices 110(0)-110(N) reference the vertices in aspects in which the index buffer 108 is associated with that primitive topology 200(0)-200(10).

Referring first to FIG. 2A, the primitive topology 200(0) shown therein is a "point list" comprising a plurality of "point" primitives represented by corresponding vertices 202(0)-202(3). Each of the vertices 202(0)-202(3) defines one of the point primitives in the point list, and thus the number of vertices required to define an instance of the point list primitive topology 200(0) is one (1). Also shown in FIG. 2A is the primitive topology 200(1), which is a "line list"

that comprises a series of "line" primitives represented by vertices 204(0)-204(3). Each of the line primitives is defined by two (2) of the vertices 204(0)-204(3). Thus, in this example, the vertices 204(0) and 204(1) define a first line primitive, while the vertices 204(2) and 204(3) define a second line primitive. Because a line list is made up of the line primitive, the minimum number of vertices required to define an instance of the line list primitive topology 200(1) is two (2).

The primitive topology 200(2) shown in FIG. 2A is a "line strip" comprising a series of connected line primitives represented by vertices 206(0)-206(3). Accordingly, as seen in the example of FIG. 2A, the vertices 206(0) and 206(1) define a first line primitive, the vertices 206(1) and 206(2) define a second line primitive, and the vertices 206(2) and 206(3) define a third line primitive. Like the line list primitive topology 200(1), the minimum number of vertices required to define an instance of the line strip primitive topology 200(2) is two (2).

The primitive topology 200(3) in the example of FIG. 2A is a "line loop" that comprises a series of connected line primitives, represented by vertices 208(0)-208(4), that form a closed polygon. Thus, the vertices 208(0) and 208(1) define a first line primitive, the vertices 208(1) and 208(2) define a second line primitive, the vertices 208(2) and 208(3) define a third line primitive, the vertices 208(3) and 208(4) define a fourth line primitive, and finally the vertices 208(4) and 208(0) define a fifth line primitive that closes the line loop. The minimum number of vertices required to define an instance of the line loop primitive topology 200(3) is two (2).

Further illustrated in FIG. 2A is the primitive topology 200(4), which is a "triangle list" wherein each group of three (3) vertices among vertices 210(0)-210(5) defines a separate "triangle" primitive. In this example, the vertices 210(0)-210(2) define a first triangle primitive, while the vertices 210(3)-210(5) define a second triangle primitive. Because a triangle list is made up of the triangle primitive, the minimum number of vertices required to define an instance of the triangle list primitive topology 200(4) is three (3).

The primitive topology 200(5) of FIG. 2A is a "triangle strip" that comprises a series of connected triangle primitives defined by vertices 212(0)-212(6). The first three vertices 212(0)-212(2) define a first triangle primitive, and each subsequent vertex 212(3)-212(6) defines an additional triangle primitive defined by that subsequent vertex and the two (2) preceding vertices. For example, the vertices 212(3), 212(2), and 212(1) define a second triangle primitive, the vertices 212(4), 212(3), and 212(2) define a third triangle primitive, and so forth in like fashion. The minimum number of vertices required to define an instance of the triangle strip primitive topology 200(5) is three (3).

The primitive topology 200(6) is a "triangle fan" comprising vertices 214(0)-214(4), where the first three vertices 214(0)-214(2) define a first triangle primitive and each subsequent vertex 214(3)-214(4) defines an additional triangle primitive defined by that subsequent vertex, the preceding vertex, and the first vertex 214(0). Thus, in this example, the vertices 214(3), 214(2), and 214(0) define a second triangle primitive, and the vertices 214(4), 214(3), and 214(0) define a third triangle primitive. As with the triangle list and the triangle strip, the minimum number of vertices required to define an instance of the triangle fan primitive topology 200(6) is three (3).

Turning now to FIG. 2B, the primitive topologies 200(7)-200(10) are illustrated. The primitive topologies 200(7)-200(10) are known as primitives "with adjacency," in that they include vertices that define adjacent primitives surrounding the primitives to be rendered. The adjacent primitives provide additional information to the GPU 104 that is useful when performing tasks such as geometry shading. In this regard, FIG. 2B illustrates the primitive topology 200(7) that is known as a "line list with adjacency," and comprises vertices 216(0)-216(7) in this example. The vertices 216(1) and 216(2) define a first line primitive, while the vertices 216(0) and 216(3) provide adjacency data. Similarly, the vertices 216(5) and 216(6) define a second line primitive, while the vertices 216(4) and 216(7) are included as adjacency data. The minimum number of vertices required to define an instance of the line list with adjacency primitive topology 200(7) is four (4): two (2) vertices to define a line primitive and two (2) adjacent vertices.

The primitive topology 200(8) is a "line strip with adjacency" comprising vertices 218(0)-218(5) in the example of FIG. 2B. The vertices 218(1) and 218(2) define a first line primitive, the vertices 218(2) and 218(3) define a second line primitive, and the vertices 218(3) and 218(4) define a third line primitive. Additionally, the vertices 218(0) and 218(5) provide adjacency data for the line strip. Similar to the line list with adjacency, the minimum number of vertices required to define an instance of the line strip with adjacency primitive topology 200(8) is four (4): two (2) vertices to define a line primitive and two (2) adjacent vertices.

The primitive topology 200(9) is a "triangle list with adjacency" that comprises vertices 220(0)-220(11). In a triangle list with adjacency, an adjacent vertex is provided for each pair of vertices of each triangle primitive. Thus, in this example, a first triangle primitive is defined by the vertices 220(0), 220(2), and 220(4), with the vertices 220(1), 220(3), and 220(5) providing adjacency data. Likewise, the vertices 220(6), 220(8), and 220(10) define a second triangle primitive, with vertices 220(7), 220(9), and 220(11) providing adjacency data. The minimum number of vertices required to define an instance of a triangle list with adjacency primitive topology 200(9) is six (6): three (3) vertices to define a triangle primitive and three (3) adjacent vertices.

Finally, the primitive topology 200(10) is a "triangle strip with adjacency," and comprises vertices 222(0)-222(13) in the example of FIG. 2B. A triangle strip with adjacency includes an adjacent vertex for each pair of vertices along the outside edge of the triangle strip. Accordingly, as shown in FIG. 2B, the vertices 222(0), 222(2), and 222(4) define a first triangle primitive, the vertices 222(2), 222(4), and 222(6) define a second triangle primitive, the vertices 222(4), 222(6), and 222(8) define a third triangle primitive, and so forth in similar manner. In addition, the vertices 222(1), 222(3), 222(5), 222(7), 222(9), 222(11), and 222(13) provide adjacency data. Like the triangle list with adjacency, the minimum number of vertices required to define an instance of the triangle strip with adjacency primitive topology 200(10) is six (6): three (3) vertices to define a triangle primitive and three (3) adjacent vertices.

Figure 3:
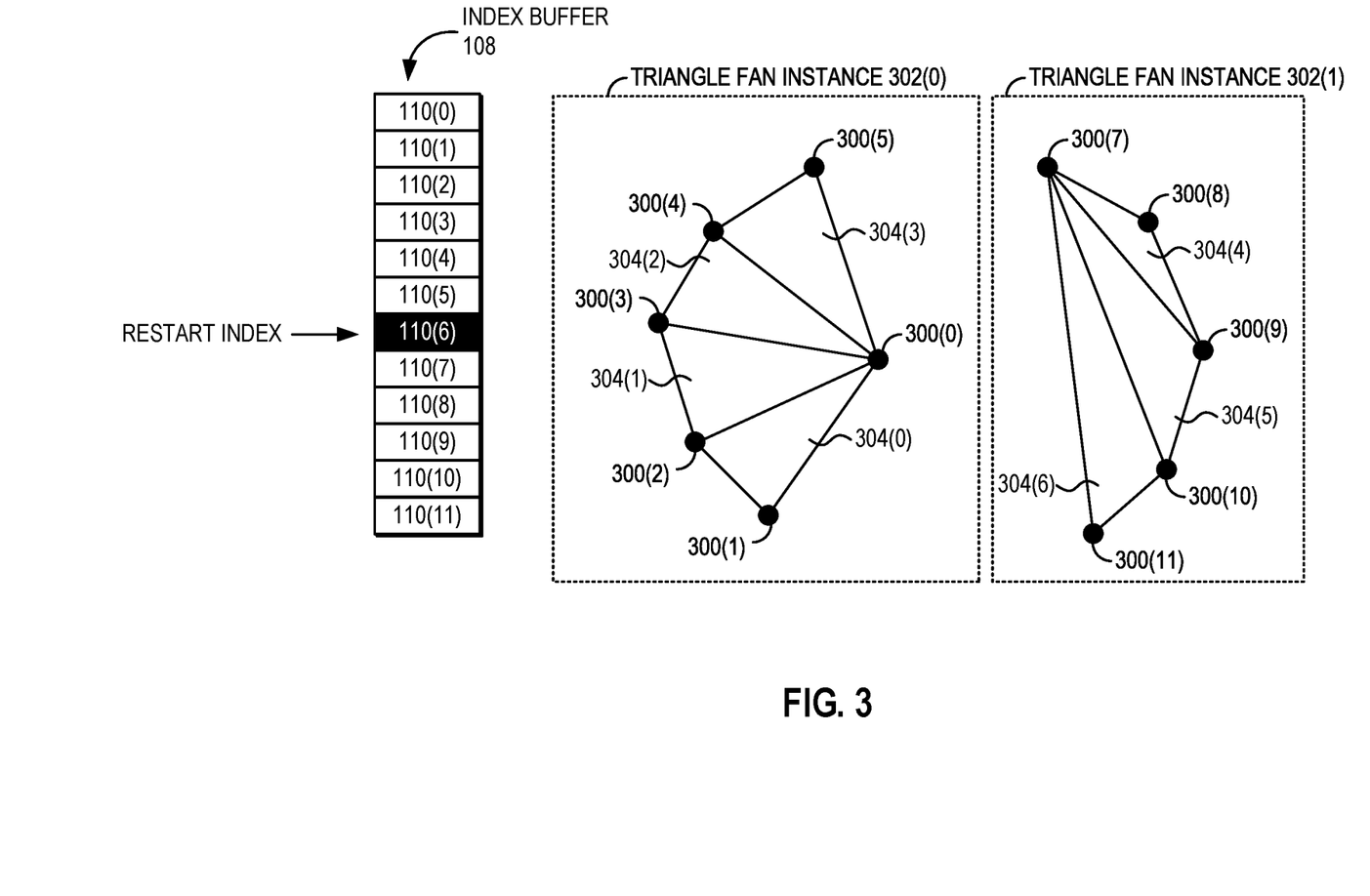
FIG. 3 is a block diagram illustrating the use of a restart index in an index buffer of the GPU of FIG. 1 to process two instances of the triangle fan primitive topology, according to some aspects.

To illustrate the use of a restart index in the index buffer 108 of the GPU 104 of FIG. 1 to assemble two instances of the triangle fan primitive topology 200(6) of FIG. 2A according to some aspects, FIG. 3 is provided. In FIG. 3, the index buffer 108 and the indices 110(0)-110(N) (where N=11) of FIG. 1 are illustrated, with the index buffer 108 being associated with the triangle fan primitive topology 200(6). The indices 110(0)-110(5) and 110(7)-110(11) of the index buffer 108 point to vertex data for corresponding vertices 300(0)-300(5) and 300(7)-300(11). Note, though, that the index 110(6) of the index buffer 108 is a restart index, indicating that the index 110(6) stores a specified data value that, when encountered during processing of the indices 110(0)-110(N), causes the GPU 104 to begin assembling a new primitive from the next sequential index (the index 110(7), in this example).

If the restart index 110(6) pointed to vertex data, the GPU 104 would process the indices 110(0)-110(11) of the index buffer 108 as a single instance (not shown) of the triangle fan primitive topology 200(6). That single instance would comprise a first triangle primitive defined by the first three vertices indicated by the indices 110(0)-110(2), with each subsequent index 110(3)-110(11) defining an additional triangle primitive defined by vertices indicated by that subsequent index, the preceding index, and the first index 110(0).

However, because of the presence of the restart index 110(6), the GPU 104 processes the indices 110(0)-110(5) and the indices 110(7)-110(11) as two separate triangle fan instances 302(0) and 302(1). The triangle fan instance 302(0) comprises three vertices 300(0)-300(2) that correspond to the indices 110(0)-110(2), and that define a triangle primitive 304(0). The vertex 300(3) (corresponding to the index 110(3)) and the vertices 300(2) and 300(0) further define a triangle primitive 304(1), the vertex 300(4) (corresponding to the index 110(4)) and the vertices 300(3) and 300(0) define a triangle primitive 304(2), and the vertex 300(5) (corresponding to the index 110(5)) and the vertices 300(4) and 300(0) define a triangle primitive 304(3). The GPU 104 then does a "restart" by treating the index 110(7) as a new center vertex for the triangle fan instance 302(1). As a result, the triangle fan instance 302(1) comprises three vertices 300(7)-300(9) that correspond to the indices 110(7)-110(9), and that define a triangle primitive 304(4). The vertex 300(10) (corresponding to the index 110(10)) and the vertices 300(9) and 300(7) further define a triangle primitive 304(5), and the vertex 300(11) (corresponding to the index 110(11)) and the vertices 300(10) and 300(7) define a triangle primitive 304(6).

Figure 4:
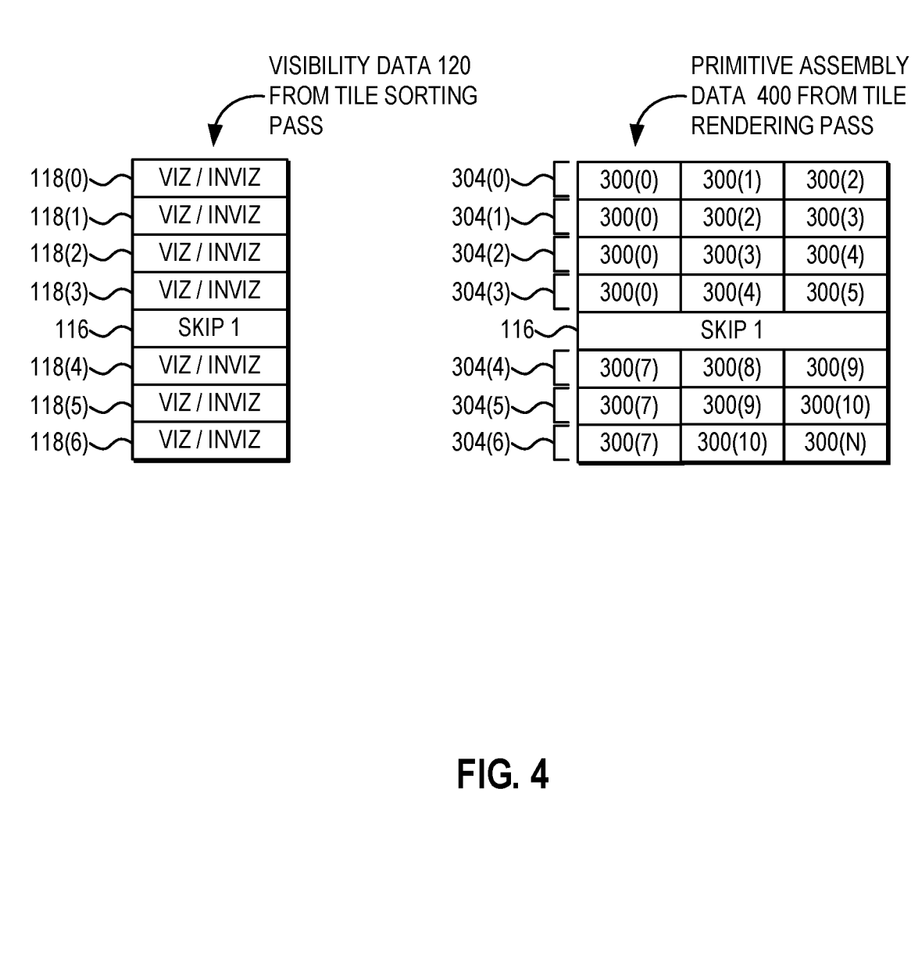
FIG. 4 is a block diagram illustrating exemplary visibility data, comprising visibility statuses and a skip count, generated by the GPU of FIG. 1 during a tile sorting pass, and corresponding primitive assembly data generated by the GPU of FIG. 1 during a tile rendering pass, according to some aspects.

FIG. 4 provides an exemplary illustration of the skip count 116 and the visibility data 120, comprising the visibility statuses 118(0)-118(6) (i.e., S=6 in this example), that are generated by the GPU 104 of FIG. 1 during a tile sorting pass, and corresponding exemplary primitive assembly data 400 generated by the GPU 104 of FIG. 1 during a tile rendering pass according to some aspects. For purposes of illustration, the vertices 300(0)-300(5) and 300(7)-300(11) and the triangle primitives 304(0)-304(6) of FIG. 3 are referenced in describing FIG. 4. As previously discussed, during the tile sorting process, the GPU 104 determines a location of the restart index 110(6) in the plurality of indices 110(0)-110(N) of the index buffer 108, and determines the skip count 116 indicating a number of indices to skip among the plurality of indices 110(0)-110(N) during the tile rendering pass, based on the triangle fan primitive topology 200(6) and the location of the restart index 110(6). Subsequently, during the tile rendering pass, the GPU 104 can bypass fetching of the restart index 110(6) based on the skip count 116, thus enabling parallel index fetching and primitive assembly.

In some aspects, the GPU 104 may determine the skip count 116 by determining that the location of a restart index is within the first V indices of the plurality of indices 110(0)-110(N), where V represents a minimum number of indices required to define the primitive topology associated with the index buffer 108. If so, the GPU 104 determines that the skip count 116 is equal to the location of the restart index. For example, the minimum number of indices (pointing to unique vertices) required to define the triangle fan primitive topology 200(6) is three (3) (V=3). Thus, if the GPU 104 determines that the location of a restart index is one of index 110(0), index 110(1), or index 110(2), then the GPU 104 will determine that the skip count is 1, 2, or 3, respectively. When the GPU 104 begins processing the index buffer 108 during the tile rendering pass, the GPU 104 will bypass fetching of the indicated number of the indices 110(0)-110(N), including the restart index, at the beginning of the index buffer 108. Some aspects may provide that the GPU 104 may determine the skip count 116 by determining that the location of the restart index is subsequent to an ordinal first primitive of the one or more primitives (e.g., the triangle primitive 304(0) of the triangle primitives 304(0)-304(6)). If so, the GPU 104 in such aspects determines that the skip count is equal to one (1).

The values for the skip count 116 that may be determined by the GPU 104 for the primitive topologies 200(0)-200(10) determined according to the above rules are summarized below in Table 1:

TABLE 1

| Primitive Topology | Primitive Position | Location of Restart Index (1-N) | Skip Count |
|---|---|---|---|
| Point List | — | 1 | 1 |
| Line List | — | 1 | 1 |
|  |  | 2 | 2 |
| Line Strip | First | 1 | 1 |
|  | First | 2 | 2 |
|  | Subsequent | — | 1 |
| Line Loop | First | 1 | 1 |
|  | First | 2 | 2 |
|  | Subsequent | — | 1 |
| Triangle List | — | 1 | 1 |
|  |  | 2 | 2 |
|  |  | 3 | 3 |
| Triangle Strip | First | 1 | 1 |
|  | First | 2 | 2 |
|  | First | 3 | 3 |
|  | Subsequent | — | 1 |
| Triangle Fan | First | 1 | 1 |
|  | First | 2 | 2 |
|  | First | 3 | 3 |
|  | Subsequent | — | 1 |
| Line List with Adjacency | — | 1 | 1 |
|  |  | 2 | 2 |
|  |  | 3 | 3 |
|  |  | 4 | 4 |
| Line Strip with Adjacency | First | 1 | 1 |
|  | First | 2 | 2 |
|  | First | 3 | 3 |
|  | First | 4 | 4 |
|  | Subsequent | — | 1 |
| Triangle List with Adjacency | — | 1 | 1 |
|  |  | 2 | 2 |
|  |  | 3 | 3 |
|  |  | 4 | 4 |
|  |  | 5 | 5 |
|  |  | 6 | 6 |
| Triangle Strip with Adjacency | First | 1 | 1 |
|  | First | 2 | 2 |
|  | First | 3 | 3 |
|  | First | 4 | 4 |
|  | First | 5 | 5 |
|  | First | 6 | 6 |
|  | Subsequent | — | 1 |

Applying the above rules to the indices 110(0)-110(11) of the index buffer 108 shown in FIG. 3, the GPU 104 would first determine a location of the restart index 110(6). The location of the restart index 110(6) is not within the first three (3) locations of the index buffer 108, so the GPU 104 would determine whether the location of the restart index 110(6) is subsequent to the first ordinal primitive (i.e., the triangle primitive 304(0) defined by the indices 110(0)-110(2)). In the example of FIG. 3, the location of the restart index 110(6) is subsequent to the triangle primitive 304(0), so the value of the skip count 116 is set to one (1) (indicated by the caption "SKIP 1" in FIG. 4).

As noted above, during the tile sorting pass, the GPU 104 of FIG. 1 also checks the visibility of each of the triangle primitives 304(0)-304(6), and generates the visibility data 120 comprising corresponding visibility statuses 118(0)-118(6) (captioned as "VIZ/INVIZ" in FIG. 4). The visibility data 120 is then used during the tile rendering pass to assemble the triangle primitives 304(0)-304(3) and 304(4)-304(6). In conventional operation, the GPU 104, upon encountering the restart index 110(6), would mark the subsequent triangle primitives (e.g., the primitives 304(4)-304(6), in this example) as visible for all tiles. However, in some aspects disclosed herein, the GPU 104 determines the appropriate visibility statuses 118(0)-118(6) for all of the triangle primitives 304(0)-304(6), and generates the visibility data 120 that comprises the visibility statuses 118(0)-118(6) and the skip count 116.

During the tile rendering pass, the GPU 104 assembles the triangle primitives 304(0)-304(6) based on the visibility data 120, generating the primitive assembly data 400. In the example of FIG. 4, the primitive assembly data 400 includes vertex data for each of the triangle primitives 304(0)-304(6), and also incorporates the skip count 116 to indicate that fetching of the restart index 110(6) should be bypassed.

Figure 5A:
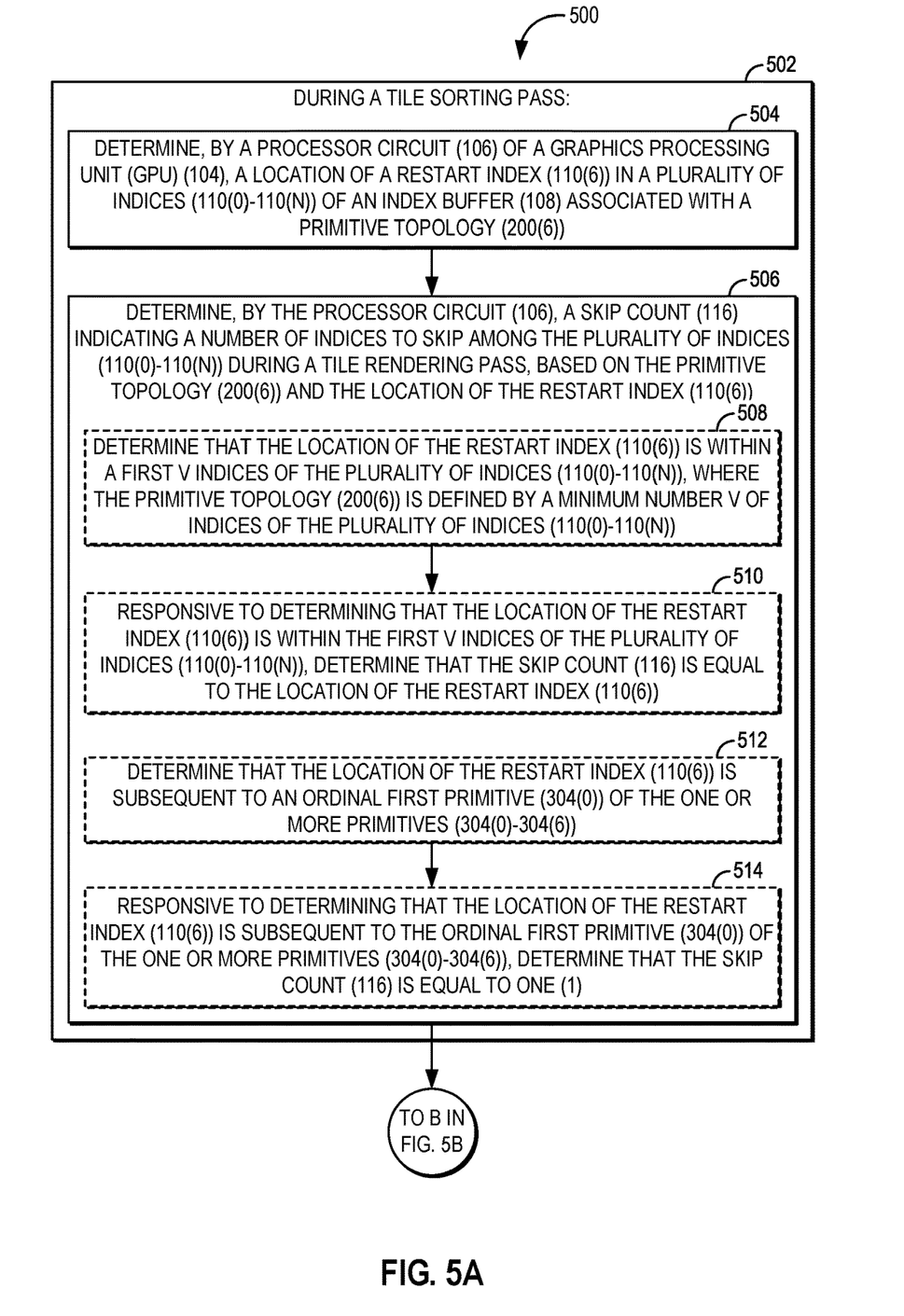
FIGS. 5A-5B provide a flowchart illustrating exemplary operations performed by the GPU of FIG. 1 for efficiently handling restart indices during TBDR, according to some aspects.
Figure 5B:
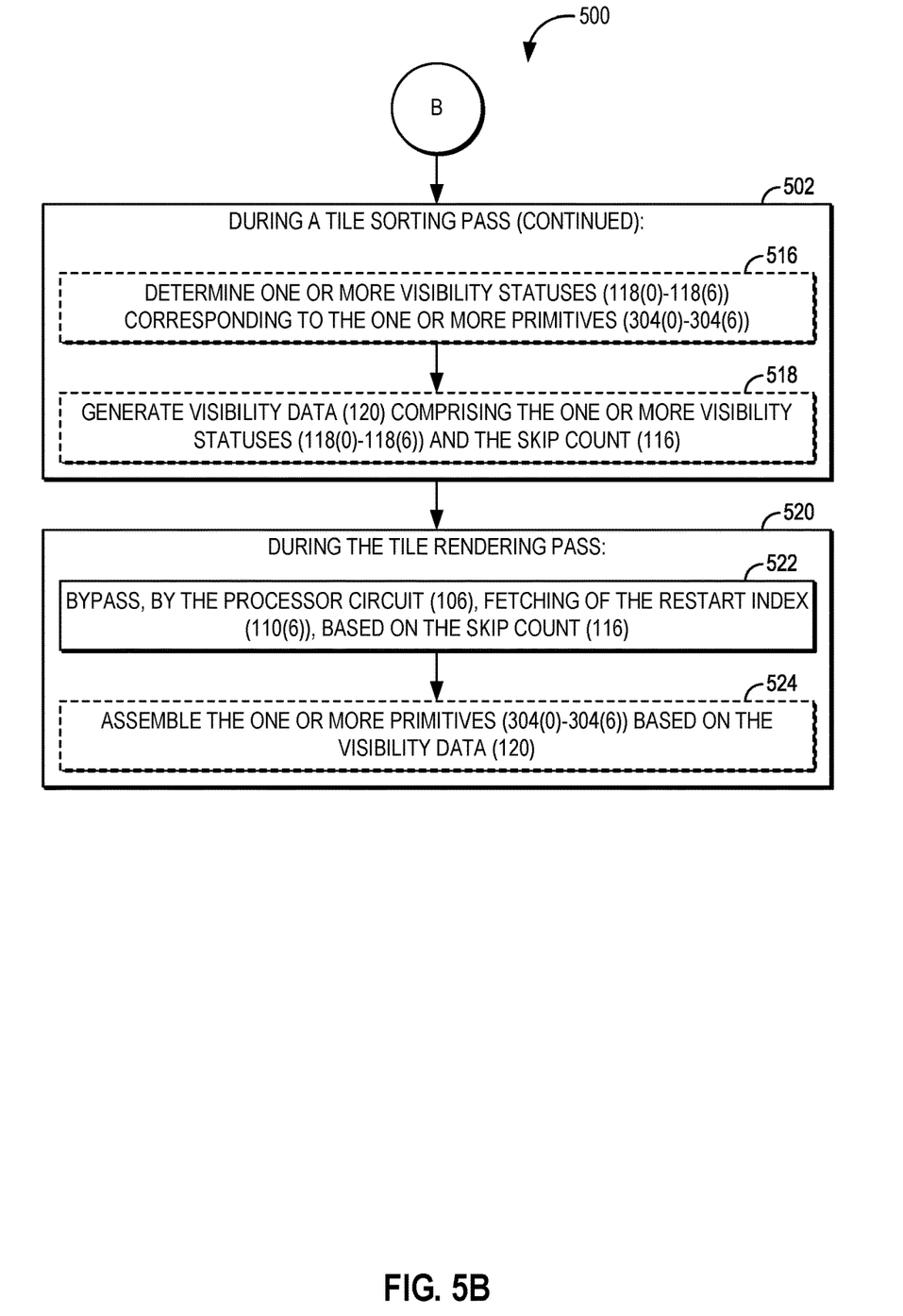

To illustrate exemplary operations performed by the GPU 104 of FIG. 1 for efficiently handling restart indices during TBDR according to some aspects, FIGS. 5A-5B provide a flowchart illustrating exemplary operations 500. For the sake of clarity, elements of FIGS. 1, 2A, and 2B are referenced in describing FIGS. 5A-5B. It is to be understood that, in some aspects, some of the exemplary operations 500 may be performed in an order other than that illustrated herein, and/or may be omitted.

The exemplary operations 500 begin in FIG. 5A with a processor circuit of a GPU (e.g., the processor circuit 106 of the GPU 104 of FIG. 1) performing operations during a tile sorting pass (block 502). During the tile sorting pass, the processor circuit 106 determines a location of a restart index (such as the restart index 110(6) of FIG. 3) in a plurality of indices of an index buffer (e.g., the indices 110(0)-110(N) of the index buffer 108 of FIGS. 1 and 3) associated with a primitive topology (such as the triangle fan primitive topology 200(6) of FIG. 2A) (block 504). The processor circuit 106 then determines a skip count (e.g., the skip count 116 of FIGS. 1 and 4) indicating a number of indices to skip among the plurality of indices 110(0)-110(N) during a tile rendering pass, based on the primitive topology 200(6) and the location of the restart index 110(6) (block 506).

In some aspects, the operations of block 506 for determining the skip count 116 may comprise the processor circuit 106 determining that the location of the restart index 110(6) is within a first V indices of the plurality of indices 110(0)-110(N), where the primitive topology 200(6) is defined by a minimum number V of indices of the plurality of indices 110(0)-110(N) (block 508). In response to determining that the location of the restart index 110(6) is within the first V indices of the plurality of indices 110(0)-110(N), the processor circuit 106 in such aspects determines that the skip count 116 is equal to the location of the restart index 110(6) (block 510). According to some aspects, the operations of block 506 for determining the skip count 116 may comprise the processor circuit 106 determining that the location of the restart index 110(6) is subsequent to an ordinal first primitive (e.g., the triangle primitive 304(0) of FIG. 3) of one or more primitives (such as the triangle primitives 304(0)-304(6) of FIG. 3) (block 512). Responsive to determining that the location of the restart index 110(6) is subsequent to the ordinal first primitive 304(0) of the one or more primitives 304(0)-304(6), the processor circuit 106 in such aspects determines that the skip count 116 is equal to one (1) (block 514). The exemplary operations 500 in some aspects may then continue at block 516 of FIG. 5B.

Referring now to FIG. 5B, some aspects may provide that further operations are performed during the tile sorting pass (block 502). In some aspects, the processor circuit 106 may determine one or more visibility statuses (such as the visibility statuses 118(0)-118(6) of FIG. 4) corresponding to the one or more primitives 304(0)-304(6) (block 516). The processor circuit 106 then generates visibility data (such as the visibility data 120 of FIG. 4) comprising the one or more visibility statuses 118(0)-118(6) and the skip count 116 (block 518).

The processor circuit 106 next performs operations during a tile rendering pass (block 520). The processor circuit 106 bypasses fetching of the restart index 110(6), based on the skip count 116 (block 522). According to some aspects, the processor circuit 106 may also assemble the one or more primitives 304(0)-304(6) based on the visibility data 120 (block 524).

The GPU according to aspects disclosed herein and discussed with reference to FIG. 1 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
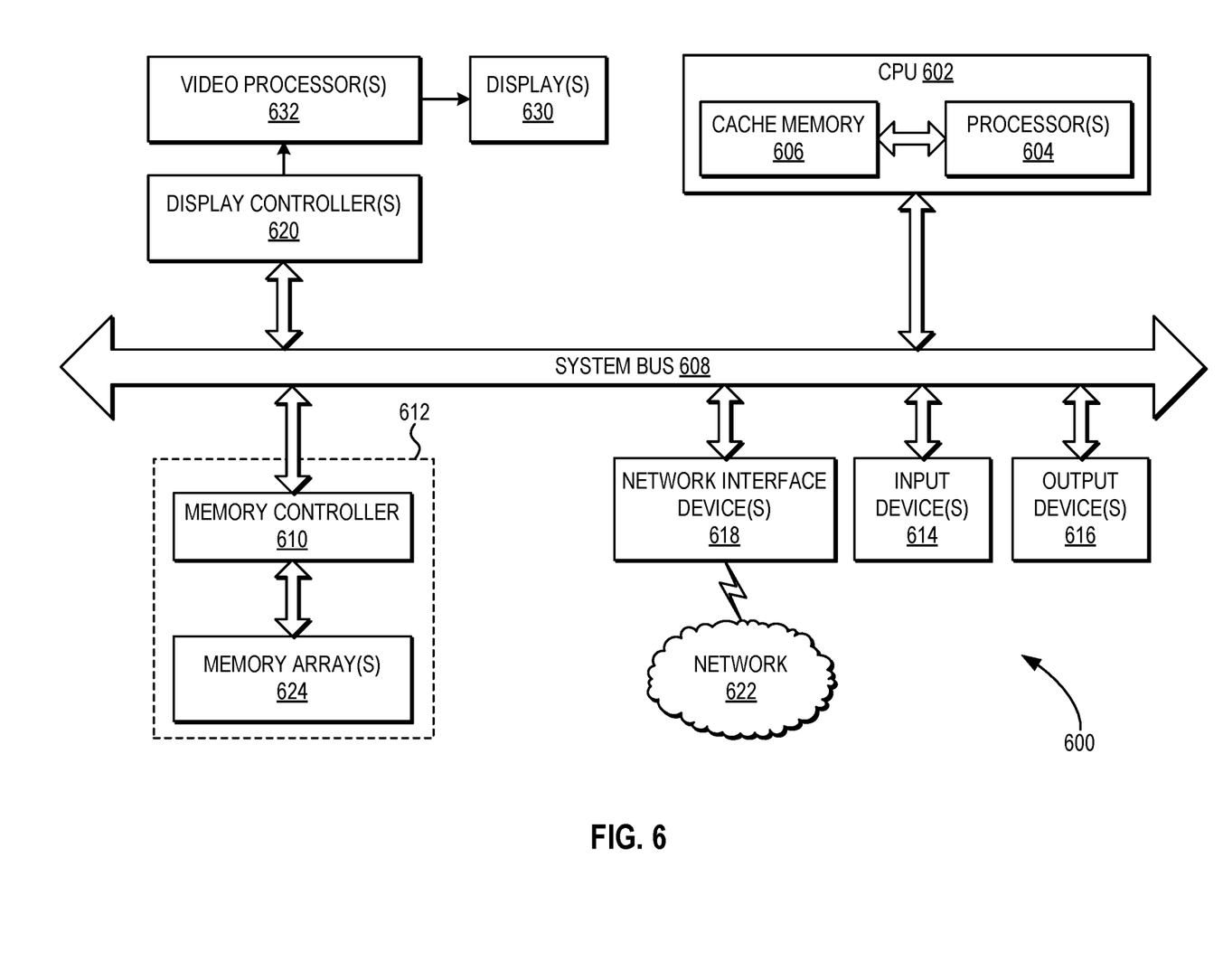
FIG. 6 is a block diagram of an exemplary processor-based device that can include the processor-based device of FIG. 1.

In this regard, FIG. 6 illustrates an example of a processor-based device 600 as illustrated and described with respect to FIG. 1. In this example, the processor-based device 600, which corresponds in functionality to the processor-based device 100 of FIG. 1, includes a central processing unit (CPU) 602 which comprises one or more processors 604 coupled to a cache memory 606. The processor(s) 604 is also coupled to a system bus 608 and can intercouple devices included in the processor-based device 600. As is well known, the processor(s) 604 communicates with these other devices by exchanging address, control, and data information over the system bus 608. For example, the processor(s) 604 can communicate bus transaction requests to a memory controller 610. Although not illustrated in FIG. 6, multiple system buses 608 could be provided, wherein each system bus 608 constitutes a different fabric.

Other devices may be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any devices configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include the memory controller 610 coupled to one or more memory arrays 624. The display controller(s) may comprise, e.g., the GPU 104 of FIG. 1.

The processor(s) 604 may also be configured to access the display controller(s) 620 over the system bus 608 to control information sent to one or more displays 630. The display controller(s) 620 sends information to the display(s) 630 to be displayed via one or more video processors 632, which process the information to be displayed into a format suitable for the display(s) 630. The display(s) 630 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A graphics processing unit (GPU), comprising:
   an index buffer associated with a primitive topology and comprising a plurality of indices; and
   a processor circuit configured to:
      during a tile sorting pass:
         determine a location of a restart index in the plurality of indices of the index buffer; and
         determine a skip count indicating a number of indices to skip among the plurality of indices during a tile rendering pass, based on the primitive topology and the location of the restart index; and
      during the tile rendering pass, bypass fetching of the restart index, based on the skip count.

2. The GPU of clause 1, wherein the primitive topology comprises one of a point list, a line list, a line strip, a line loop, a triangle list, a triangle strip, a triangle fan, a line list with adjacency, a line strip with adjacency, a triangle list with adjacency, and a triangle strip with adjacency.

3. The GPU of any one of clauses 1-2, wherein the plurality of indices defines one or more primitives of the primitive topology.

4. The GPU of clause 3, wherein the processor circuit is further configured to:
   determine one or more visibility statuses corresponding to the one or more primitives; and
   generate visibility data comprising the one or more visibility statuses and the skip count.

5. The GPU of clause 4, wherein the processor circuit is further configured to, during the tile rendering pass, assemble the one or more primitives based on the visibility data.

6. The GPU of any one of clauses 3-5, wherein:
   the primitive topology is defined by a minimum number V of indices of the plurality of indices; and
   the processor circuit is configured to determine the skip count by being configured to:
      determine that the location of the restart index is within a first V indices of the plurality of indices; and
      responsive to determining that the location of the restart index is within the first V indices of the plurality of indices, determine that the skip count is equal to the location of the restart index.

7. The GPU of any one of clauses 3-6, wherein the processor circuit is configured to determine the skip count by being configured to:
   determine that the location of the restart index is subsequent to an ordinal first primitive of the one or more primitives; and
   responsive to determining that the location of the restart index is subsequent to the ordinal first primitive of the one or more primitives, determine that the skip count is equal to one (1).

8. The GPU of any one of clauses 1-7, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

9. A graphics processing unit (GPU), comprising:
   means for determining, during a tile sorting pass, a location of a restart index in a plurality of indices of an index buffer;
   means for determining, during the tile sorting pass, a skip count indicating a number of indices to skip among the plurality of indices during a tile rendering pass, based on a primitive topology and the location of the restart index; and
   means for bypassing, during the tile rendering pass, fetching of the restart index, based on the skip count.

10. A method for efficiently handling restart indices during tile-based deferred rendering (TBDR) by a graphics processing unit (GPU), comprising:
   during a tile sorting pass:
      determining, by a processor circuit of a GPU, a location of a restart index in a plurality of indices of an index buffer associated with a primitive topology; and
      determining, by the processor circuit, a skip count indicating a number of indices to skip among the plurality of indices during a tile rendering pass, based on the primitive topology and the location of the restart index; and during the tile rendering pass, bypassing, by the processor circuit, fetching of the restart index, based on the skip count.

11. The method of clause 10, wherein the primitive topology comprises one of a point list, a line list, a line strip, a line loop, a triangle list, a triangle strip, a triangle fan, a line list with adjacency, a line strip with adjacency, a triangle list with adjacency, and a triangle strip with adjacency.

12. The method of any one of clauses 10-11, wherein the plurality of indices defines one or more primitives of the primitive topology.

13. The method of clause 12, further comprising:
determining one or more visibility statuses corresponding to the one or more primitives; and
generating visibility data comprising the one or more visibility statuses and the skip count.

14. The method of clause 13, further comprising, during the tile rendering pass, assembling the one or more primitives based on the visibility data.

15. The method of any one of clauses 12-14, wherein:
the primitive topology is defined by a minimum number V of indices of the plurality of indices; and
determining the skip count comprises:
determining that the location of the restart index is within a first V indices of the plurality of indices; and
responsive to determining that the location of the restart index is within the first V indices of the plurality of indices, determining that the skip count is equal to the location of the restart index.

16. The method of any one of clauses 12-15, wherein determining the skip count comprises:
determining that the location of the restart index is subsequent to an ordinal first primitive of the one or more primitives; and
responsive to determining that the location of the restart index is subsequent to the ordinal first primitive of the one or more primitives, determining that the skip count is equal to one (1).

17. A non-transitory computer-readable medium, having stored thereon computer-executable instructions that, when executed, cause a processor of a processor-based device to:
during a tile sorting pass:
determine a location of a restart index in a plurality of indices of an index buffer associated with a primitive topology; and
determine a skip count indicating a number of indices to skip among the plurality of indices during a tile rendering pass, based on the primitive topology and the location of the restart index; and
during the tile rendering pass, bypass fetching of the restart index, based on the skip count.

18. The non-transitory computer-readable medium of clause 17, wherein the primitive topology comprises one of a point list, a line list, a line strip, a line loop, a triangle list, a triangle strip, a triangle fan, a line list with adjacency, a line strip with adjacency, a triangle list with adjacency, and a triangle strip with adjacency.

19. The non-transitory computer-readable medium of any one of clauses 17-18, wherein the plurality of indices defines one or more primitives of the primitive topology.

20. The non-transitory computer-readable medium of clause 19, wherein the computer-executable instructions further cause the processor to:
determine one or more visibility statuses corresponding to the one or more primitives; and
generate visibility data comprising the one or more visibility statuses and the skip count.

21. The non-transitory computer-readable medium of clause 20, wherein the computer-executable instructions further cause the processor to, during the tile rendering pass, assemble the one or more primitives based on the visibility data.

22. The non-transitory computer-readable medium of any one of clauses 19-21, wherein:
the primitive topology is defined by a minimum number V of indices of the plurality of indices; and
the computer-executable instructions cause the processor to determine the skip count by causing the processor to:
determine that the location of the restart index is within a first V indices of the plurality of indices; and
responsive to determining that the location of the restart index is within the first V indices of the plurality of indices, determine that the skip count is equal to the location of the restart index.

23. The non-transitory computer-readable medium of any one of clauses 19-22, wherein the computer-executable instructions cause the processor to determine the skip count by causing the processor to:
determine that the location of the restart index is subsequent to an ordinal first primitive of the one or more primitives; and
responsive to determining that the location of the restart index is subsequent to the ordinal first primitive of the one or more primitives, determine that the skip count is equal to one (1).

What is claimed is:

1. A graphics processing unit (GPU), comprising:
an index buffer associated with a primitive topology and comprising a plurality of indices; and
a processor circuit configured to:
during a tile sorting pass:
determine a location of a restart index in the plurality of indices of the index buffer; and
determine a skip count indicating a number of indices to skip among the plurality of indices during a tile rendering pass, based on the primitive topology and the location of the restart index; and
during the tile rendering pass, bypass fetching of the restart index, based on the skip count,
wherein the plurality of indices defines one or more primitives of the primitive topology, and
wherein the processor circuit is further configured to:
determine one or more visibility statuses corresponding to the one or more primitives; and
generate visibility data comprising the one or more visibility statuses and the skip count.

2. The GPU of claim 1, wherein the primitive topology comprises one of a point list, a line list, a line strip, a line loop, a triangle list, a triangle strip, a triangle fan, a line list with adjacency, a line strip with adjacency, a triangle list with adjacency, and a triangle strip with adjacency.

3. The GPU of claim 1, wherein the processor circuit is further configured to, during the tile rendering pass, assemble the one or more primitives based on the visibility data.

4. The GPU of claim 1, wherein:
the primitive topology is defined by a minimum number V of indices of the plurality of indices; and
the processor circuit is configured to determine the skip count by being configured to:

determine that the location of the restart index is within a first V indices of the plurality of indices; and responsive to determining that the location of the restart index is within the first V indices of the plurality of indices, determine that the skip count is equal to the location of the restart index.

5. The GPU of claim 1, wherein the processor circuit is configured to determine the skip count by being configured to:

determine that the location of the restart index is subsequent to an ordinal first primitive of the one or more primitives; and responsive to determining that the location of the restart index is subsequent to the ordinal first primitive of the one or more primitives, determine that the skip count is equal to one (1).

6. The GPU of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

7. A graphics processing unit (GPU), comprising:

means for determining, during a tile sorting pass, a location of a restart index in a plurality of indices of an index buffer;

means for determining, during the tile sorting pass, a skip count indicating a number of indices to skip among the plurality of indices during a tile rendering pass, based on a primitive topology and the location of the restart index;

means for bypassing, during the tile rendering pass, fetching of the restart index, based on the skip count;

means for determining one or more visibility statuses corresponding to the one or more primitives; and means for generating visibility data comprising the one or more visibility statuses and the skip count, wherein the plurality of indices defines one or more primitives of the primitive topology.

8. A method for efficiently handling restart indices during tile-based deferred rendering (TBDR) by a graphics processing unit (GPU), comprising:

during a tile sorting pass:

determining, by a processor circuit of a GPU, a location of a restart index in a plurality of indices of an index buffer associated with a primitive topology; and determining, by the processor circuit, a skip count indicating a number of indices to skip among the plurality of indices during a tile rendering pass, based on the primitive topology and the location of the restart index;

during the tile rendering pass, bypassing, by the processor circuit, fetching of the restart index, based on the skip count;

determining one or more visibility statuses corresponding to the one or more primitives; and generating visibility data comprising the one or more visibility statuses and the skip count, wherein the plurality of indices defines one or more primitives of the primitive topology.

9. The method of claim 8, wherein the primitive topology comprises one of a point list, a line list, a line strip, a line loop, a triangle list, a triangle strip, a triangle fan, a line list with adjacency, a line strip with adjacency, a triangle list with adjacency, and a triangle strip with adjacency.

10. The method of claim 8, further comprising, during the tile rendering pass, assembling the one or more primitives based on the visibility data.

11. The method of claim 8, wherein:

the primitive topology is defined by a minimum number V of indices of the plurality of indices; and determining the skip count comprises:

determining that the location of the restart index is within a first V indices of the plurality of indices; and responsive to determining that the location of the restart index is within the first V indices of the plurality of indices, determining that the skip count is equal to the location of the restart index.

12. The method of claim 8, wherein determining the skip count comprises:

determining that the location of the restart index is subsequent to an ordinal first primitive of the one or more primitives; and responsive to determining that the location of the restart index is subsequent to the ordinal first primitive of the one or more primitives, determining that the skip count is equal to one (1).

13. A non-transitory computer-readable medium, having stored thereon computer-executable instructions that, when executed, cause a processor of a processor-based device to:

during a tile sorting pass:

determine a location of a restart index in a plurality of indices of an index buffer associated with a primitive topology; and determine a skip count indicating a number of indices to skip among the plurality of indices during a tile rendering pass, based on the primitive topology and the location of the restart index; and during the tile rendering pass, bypass fetching of the restart index, based on the skip count, wherein the plurality of indices defines one or more primitives of the primitive topology, and wherein the computer-executable instructions further cause the processor to:

determine one or more visibility statuses corresponding to the one or more primitives; and generate visibility data comprising the one or more visibility statuses and the skip count.

14. The non-transitory computer-readable medium of claim 13, wherein the primitive topology comprises one of a point list, a line list, a line strip, a line loop, a triangle list, a triangle strip, a triangle fan, a line list with adjacency, a line strip with adjacency, a triangle list with adjacency, and a triangle strip with adjacency.

15. The non-transitory computer-readable medium of claim 13, wherein the computer-executable instructions further cause the processor to, during the tile rendering pass, assemble the one or more primitives based on the visibility data.

16. The non-transitory computer-readable medium of claim 13, wherein:

the primitive topology is defined by a minimum number V of indices of the plurality of indices; and the computer-executable instructions cause the processor to determine the skip count by causing the processor to:
determine that the location of the restart index is within a first V indices of the plurality of indices; and
responsive to determining that the location of the restart index is within the first V indices of the plurality of indices, determine that the skip count is equal to the location of the restart index.

17. The non-transitory computer-readable medium of claim 13, wherein the computer-executable instructions cause the processor to determine the skip count by causing the processor to:
determine that the location of the restart index is subsequent to an ordinal first primitive of the one or more primitives; and
responsive to determining that the location of the restart index is subsequent to the ordinal first primitive of the one or more primitives, determine that the skip count is equal to one (1).

\* \* \* \* \*